United States Patent
Mueller

(10) Patent No.: US 9,102,335 B2
(45) Date of Patent: Aug. 11, 2015

(54) VEHICLE AND METHOD FOR CONTROLLING A VEHICLE

(71) Applicant: AUDI AG, Ingolstadt (DE)

(72) Inventor: Rolf Mueller, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/350,906

(22) PCT Filed: Oct. 10, 2012

(86) PCT No.: PCT/EP2012/004242
§ 371 (c)(1),
(2) Date: Apr. 10, 2014

(87) PCT Pub. No.: WO2013/053468
PCT Pub. Date: Apr. 18, 2013

(65) Prior Publication Data
US 2015/0051778 A1    Feb. 19, 2015

(30) Foreign Application Priority Data
Oct. 13, 2011 (DE) .......................... 10 2011 115 854

(51) Int. Cl.
*B60W 50/035* (2012.01)
*B60W 50/029* (2012.01)
(Continued)

(52) U.S. Cl.
CPC .............. *B60W 50/035* (2013.01); *B60W 10/04* (2013.01); *B60W 10/06* (2013.01); *B60W 10/18* (2013.01);
(Continued)

(58) Field of Classification Search
CPC ..... B60W 10/04; B60W 10/06; B60W 10/18; B60W 10/20; B60W 2050/146; B60W 2050/0295; B60W 50/02–50/045; B60W 2050/0002–2050/0018; B60W 2050/0062–2050/0096; B60W 2050/0292–2050/0297; B60W 50/0098; B60W 30/18
USPC .......................................................... 701/23
See application file for complete search history.

(56) References Cited

U.S. PATENT DOCUMENTS

| | | | |
|---|---|---|---|
| 7,630,800 B2 | 12/2009 | Hirano et al. | |
| 2006/0156127 A1* | 7/2006 | Harter et al. .................. | 714/732 |

(Continued)

FOREIGN PATENT DOCUMENTS

| | | |
|---|---|---|
| DE | 10231819 | 2/2004 |
| DE | 10357922 | 7/2004 |

(Continued)

OTHER PUBLICATIONS

English Language International Search Report for PCT/EP2012/004242, mailed Dec. 4, 2012, 2 pages.
(Continued)

*Primary Examiner* — Fadey Jabr
*Assistant Examiner* — Courtney Heinle
(74) *Attorney, Agent, or Firm* — Staas & Halsey LLP

(57) ABSTRACT

A vehicle has at least one movement system which can influence the movement of the vehicle and which can operate in a normal mode or in at least one emergency mode. An availability coordinator is coupled to each movement system. A control system controls an autonomous driving process. The availability coordinator is coupled to the control system and is designed such that said coordinator monitors the availability of each movement system. The availability coordinator specifies whether each movement system is to operate in the normal mode or in one of the emergency modes dependent on at least one of the availabilities; and activates or deactivates the control system dependent on at least one of the availabilities.

20 Claims, 1 Drawing Sheet

(51) Int. Cl.
*B60W 50/038* (2012.01)
*B60W 10/06* (2006.01)
*B60W 10/18* (2012.01)
*B60W 10/20* (2006.01)
*B60W 30/18* (2012.01)
*B60W 10/04* (2006.01)
*B60W 50/14* (2012.01)

(52) U.S. Cl.
CPC ............... *B60W 10/20* (2013.01); *B60W 30/18* (2013.01); *B60W 50/029* (2013.01); *B60W 50/038* (2013.01); *B60W 50/14* (2013.01); *B60W 2050/0295* (2013.01); *B60W 2050/146* (2013.01)

(56) References Cited

U.S. PATENT DOCUMENTS

| | | | | |
|---|---|---|---|---|
| 2009/0018712 | A1* | 1/2009 | Duncan et al. | 701/2 |
| 2010/0179719 | A1 | 7/2010 | Kimura et al. | |
| 2011/0241862 | A1* | 10/2011 | Debouk et al. | 340/439 |

FOREIGN PATENT DOCUMENTS

| | | |
|---|---|---|
| DE | 10333652 | 2/2005 |
| DE | 102005050310 | 6/2006 |
| DE | 102005022680 | 11/2006 |
| DE | 102007021871 | 2/2008 |
| DE | 102006056668 | 6/2008 |
| DE | 102009050399 | 5/2011 |
| DE | 102011115854.9 | 10/2011 |
| EP | 1763454 | 7/2008 |
| WO | 2004/005096 | 1/2004 |
| WO | PCT/EP2012/004242 | 10/2012 |

OTHER PUBLICATIONS

WIPO English Language Translation of the International Preliminary Report on Patentability for PCT/EP2012/004242, mailed Apr. 17, 2014, 8 pages.

* cited by examiner

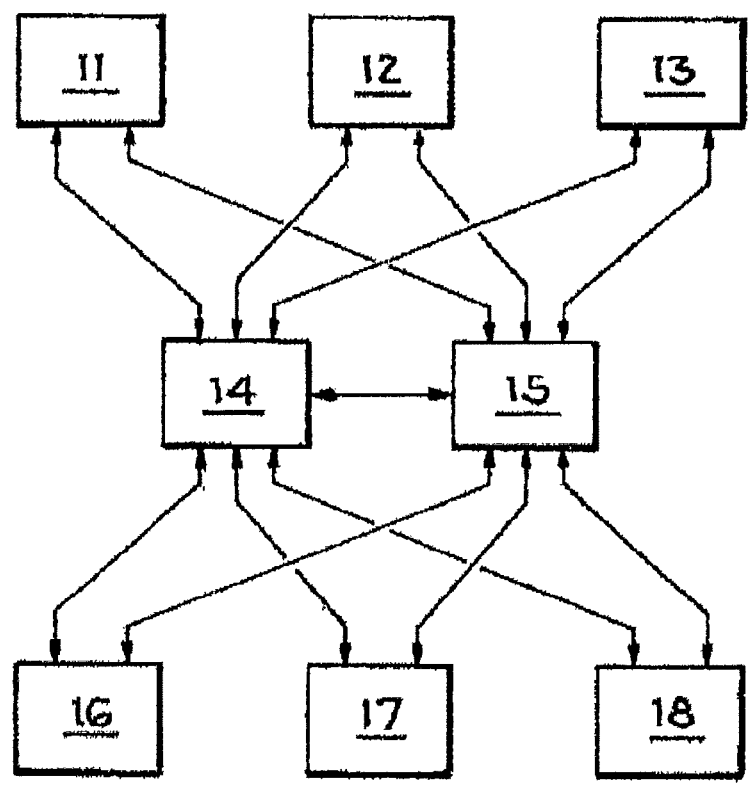

VEHICLE AND METHOD FOR CONTROLLING A VEHICLE

CROSS REFERENCE TO RELATED APPLICATIONS

This application is based on and hereby claims priority to International Application No. PCT/EP2012/004242 filed on Oct. 10, 2012 and German Application No. 10 2011 115 854.9 filed on Oct. 13, 2011, the contents of which are hereby incorporated by reference.

BACKGROUND

The invention relates to a vehicle and to a method for controlling a vehicle.

Such vehicles and methods are known in the related art, for example from motor vehicles comprising a combination instrument with a microcontroller and indicator lights, which is an availability coordinator in the sense of this document. The combination instrument is connected, as a control device, to a data bus of the motor vehicle, for example a CAN bus or FlexRay bus, in order to gather the data needed to display the corresponding operating states by the indicator lights from the further control devices, for example the engine controller, the anti-lock braking system (ABS) and the electronic stability program (ESP), which are likewise connected to the data bus. The failure or a malfunction or a restricted functionality of particular systems of the motor vehicle results in the driver being requested, via corresponding warnings in the combination instrument, for example by indicator lights flashing red, to switch off the vehicle, for example in the event of failure of an electric steering system or in the event of an excessively low oil level or in the event of an excessively hot engine or in the event of excessively little brake fluid. This organizational measure is absolutely necessary since the driver is no longer able to safely drive the vehicle.

The document DE 103 57 922 A1 discloses a method for controlling actuators in vehicles, in which signals are generated in a multiplicity of drive systems and are supplied to a coordinator. The coordinator generates, on the one hand, control signals for controlling actuators and, on the other hand, feedback signals which are transmitted to a feedback device for conveying information relating to the driving state of the vehicle to the driver. The control signals generated are supplied to a control system which controls the actuators on the basis of the supplied control signals. According to the disclosure, the drive systems are divided into at least two groups. The measures which are carried out when a fault occurs in a drive system are determined in this case on the basis of the affiliation of the drive system to one of the groups. If a fault occurs in one of the drive systems, a safe state is induced and the corresponding drive system is then deactivated. The driver is informed of this. The driving task must then be returned to the driver in this safe state. In this case, it is not always ensured that the vehicle can continue to be operated without restrictions. Therefore, it may be necessary to allow only restricted driving, to cause the search for a workshop or even to cause the vehicle standstill. Therefore, deactivation of autonomous driving is induced.

Another method for controlling the operation of a fully automatic driver assistance system designed for independent vehicle steering in a motor vehicle is known from the document DE 10 2009 050 399 A1, in which, if at least one takeover condition occurs, a driver takeover request is output which, when the driver takes over driving, in particular by operating the steering wheel and/or the pedals and/or a switch, results in deactivation of the driver assistance system, in which case, if a takeover condition occurs, an action plan comprising at least one driving intervention, which is used to change the motor vehicle to a safe state, in particular the standstill, and also a driver takeover request, in particular, is carried out, said action plan containing a temporal sequence of control commands for vehicle systems.

The vehicle breakdown caused by the required switching-off is very unpleasant for the driver and may endanger his safety.

SUMMARY

Therefore, one possible object is to keep the availability of the vehicle and a minimum readiness to drive as high as possible.

According to a first aspect, the inventor proposes a vehicle comprising
- at least one movement system which can influence the movement of the vehicle and can operate in a normal mode and at least one emergency mode;
- an availability coordinator which is coupled to each movement system;
- a control system for autonomous driving;
- the availability coordinator being designed in such a manner that it
  - monitors the availability of each movement system;
  - specifies whether each movement system is intended to operate in its normal mode or one of its emergency modes on the basis of at least one of the availabilities;
  - activates the control system on the basis of at least one of the availabilities.

The practice of deactivating the control system for autonomous driving on the basis of at least one of the availabilities is known from the related art.

If, for example, the availability of a movement system indicates a restricted functionality or even the failure of this movement system, the availability coordinator can thus optimize the availability and readiness to drive of the vehicle by suitably selecting and specifying an emergency mode of this movement system and/or an emergency mode of one of the other movement systems, with the result that the safe driving of the vehicle can be ensured using suitable fallback responses at the vehicle level, depending on the severity of the fault which has occurred. In addition, if the availabilities, for example, indicate particularly serious faults which would result in a breakdown in the known vehicles, the availability coordinator can activate the control system for autonomous driving if necessary, with the result that the journey to the next workshop or to the next gas station or to a safe emergency stopping place, for example, is enabled.

The availability coordinator can be designed in any desired manner as required, for example in the form of a combination instrument with indicator lights and a microcontroller which is coupled to a data bus of the motor vehicle, for example a CAN bus or FlexRay bus.

The control system can be designed in any desired manner as required and may be coupled, for example, to a data bus of the motor vehicle, for example a CAN bus or FlexRay bus.

Each movement system may be designed in any desired manner as required, for example in such a manner that it can influence the longitudinal dynamics and/or the transverse dynamics of the vehicle, and/or may comprise, for example, at least one drive and/or at least one brake and/or at least one steering system.

The control system is preferably coupled to each movement system, preferably via a data bus of the motor vehicle, for example a CAN bus or FlexRay bus. When activated, the control system can therefore carry out autonomous driving by suitably controlling the movement systems.

Provision may be made for the control system to be able to operate in a normal mode and at least one emergency mode, and for the availability coordinator to be designed in such a manner that it monitors the availability of the control system and specifies whether the control system is intended to operate in its normal mode or one of its emergency modes on the basis of at least one of the availabilities.

One of these emergency modes may be provided, for example, for the failure of the control system and may then preferably involve this failure being indicated to the driver by the availability coordinator, for example by an indicator light of a combination instrument, so that the driver can have the vehicle repaired in a workshop.

Each of the proposed vehicles may preferably also comprise at least one function system which can influence a function of the vehicle, which is not the movement of the vehicle, and can operate in a normal mode and at least one emergency mode, the availability coordinator being coupled to each function system and being designed in such a manner that it monitors the availability of each function system and specifies whether each function system is intended to operate in its normal mode or one of its emergency modes on the basis of at least one of the availabilities.

The availabilities which can be used to specify the modes of the movement systems, of the control system and of the function systems may comprise both the availabilities of the movement systems and of the control system and the availabilities of the function systems.

Each function system may be designed in any desired manner as required and may comprise, for example, at least one mobile telephone system and/or at least one navigation system and/or at least one hazard warning system.

The control system is preferably coupled to each function system, preferably via a data bus of the motor vehicle, for example a CAN bus or FlexRay bus. When activated, the control system can therefore access the navigation system, for example, in order to determine the route to the next workshop or to the next gas station or to a safe emergency stopping place and to carry out autonomous driving according to this route, can send an automatic emergency call to a suitable receiver via the mobile telephone system and can automatically switch on the hazard warning system.

Provision may be made for the availability coordinator to be designed in such a manner that it reports a malfunction of the control system. Therefore, the availability coordinator can report a failure of the control system, for example by a suitable indicator light of a combination instrument.

According to a second aspect, the inventor proposes a method for controlling a vehicle, the vehicle comprising:
 at least one movement system which can influence the movement of the vehicle and can operate in a normal mode and at least one emergency mode;
 a control system for autonomous driving;
 the availability of each movement system being monitored;
 it being specified whether each movement system is intended to operate in its normal mode or one of its emergency modes on the basis of at least one of the availabilities;
 the control system being activated on the basis of at least one of the availabilities.

The practice of deactivating the control system for autonomous driving on the basis of at least one of the availabilities is known from the related art.

The vehicle may be designed in any desired manner as required, for example like one of the proposed vehicles.

Provision may be made for the control system to be able to operate in a normal mode and at least one emergency mode, for the availability of the control system to be monitored, and for it to be specified whether the control system is intended to operate in its normal mode or one of its emergency modes on the basis of at least one of the availabilities.

Provision may be made for the vehicle to also comprise at least one function system which can influence a function of the vehicle, which is not the movement of the vehicle, and can operate in a normal mode and at least one emergency mode, for the availability of each function system to be monitored, and for it to be specified whether each function system is intended to operate in its normal mode or one of its emergency modes on the basis of at least one of the availabilities.

A malfunction of the control system is preferably reported. This reporting is preferably carried out by indication using a suitable indicator light in a combination instrument.

Provision may be made for the vehicle to also comprise an availability coordinator which monitors the availabilities, and for a malfunction of the availability coordinator to be reported. A malfunction of the availability coordinator can be reported in any desired manner as required, for example by indication using a suitable indicator light in a combination instrument.

The statements made with respect to one of the aspects of the proposal invention, in particular with respect to individual features of this aspect, also analogously apply in a corresponding manner to the other aspects of the proposal.

BRIEF DESCRIPTION OF THE DRAWINGS

These and other objects and advantages of the present invention will become more apparent and more readily appreciated from the following description of the preferred embodiments, taken in conjunction with the accompanying drawing of which:

In the single FIGURE, the drawing shows a block diagram of part of a vehicle in a preferred embodiment.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The FIGURE schematically illustrates part of a proposed vehicle 10 according to one potentially preferred embodiment. This vehicle 10 comprises three movement systems in the form of a drive 11, a brake 12 and a steering system 13, an availability coordinator 14 in the form of a combination instrument, a control system 15 for autonomous driving and three function systems in the form of a mobile telephone system 16, a navigation system 17 and a hazard warning system 18.

Each movement system 11, 12, 13 can influence the movement of the vehicle 10 and can operate in a normal mode and at least one emergency mode.

Each function system 16, 17, 18 can influence a function of the vehicle 10, which is not the movement of the vehicle 10, and can operate in a normal mode and at least one emergency mode.

The control system 15 is coupled to each movement system 11, 12, 13 and to each function system 16, 17, 18 and can operate in a normal mode and at least one emergency mode.

The availability coordinator 14 is coupled to each movement system 11, 12, 13, to the control system 15 and to each function system 16, 17, 18 and is designed in such a manner that it monitors the availability of each movement system 11, 12, 13, of the control system 15 and of each function system 16, 17, 18. The availability coordinator 14 is also designed in such a manner that it specifies whether each movement system 11, 12, 13, the control system 15 and each function system 16, 17, 18 is intended to operate in its normal mode or one of its emergency modes on the basis of at least one of the availabilities. In addition, the availability coordinator 14 is designed in such a manner that it activates or deactivates the control system 15 on the basis of at least one of the availabilities.

In this preferred embodiment, the availability coordinator 14 is formed by a combination instrument which comprises an indicator light (not illustrated) and reports a malfunction of the control system 15 to the driver using this indicator light.

The proposed method of operation of the vehicle 10 as well as a method for controlling the vehicle 10 are now explained below using a case example. In this case example, the availability of the steering system 13, which is in the form of an electric steering system here, is restricted to the effect that the detection of the steering wheel movements using sensors has failed.

The availability coordinator 14 detects this availability or is informed of this availability by the steering system 13, whereupon it activates an indicator light in the combination instrument, activates the control system 15 and specifies that the steering system 13 is intended to operate in an emergency mode. This emergency mode provides for the steering system 13 to no longer be allowed to react to the sensor detection of the steering wheel movements since the corresponding sensor signals are possibly defective and instead to now be controlled by the activated control system 15 for autonomous driving. The activated control system 15 thus controls the steering system 13 and autonomously drives the vehicle 10 to the next safe emergency stopping place, which it heads for using the navigation system 17. The control system 15 also uses the drive 11 and the brake 12 for autonomous driving by suitable control.

In addition, the availability coordinator 14 specifies an emergency mode for the mobile telephone system 16, in which mode said system sends an automatic emergency call to the nearest workshop located by the availability coordinator with the aid of the navigation system 17, specifies an emergency mode for the hazard warning system 18, in which mode said system is switched on, and specifies an emergency mode for the drive 11, in which mode the drive limits the vehicle speed to a particular maximum value.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A vehicle comprising:
a movement system disposed in the vehicle which includes at least one of a drive system, a brake system and a steering system, to influence movement of the vehicle, the movement system being operable in a normal mode and in an emergency mode;
a control system for autonomous driving; and
an availability coordinator, comprising at least one microprocessor, coupled to the control system for autonomous driving and to the movement system, to monitor availability of the movement system, to specify based on the availability, whether the movement system is to operate in its normal mode or in its emergency mode, and when the availability indicates restricted functionality or failure, to turn on the control system for autonomous driving.

2. The vehicle as claimed in claim 1, wherein
the control system for autonomous driving is operable in a normal mode and in an emergency mode, and
the availability coordinator monitors availability of the control system for autonomous driving such that a plurality of availabilities are monitored, and
the availability coordinator specifies whether the control system for autonomous driving is to operate in its normal mode or in its emergency mode based on at least one of the availabilities.

3. The vehicle as claimed in claim 1, wherein
the vehicle further comprises a function system to influence a function of the vehicle other than movement of the vehicle, the function system being operable in a normal mode and in an emergency mode,
the availability coordinator is coupled to the function system to monitor availability of the function system such that a plurality of availabilities are monitored, and
the availability coordinator specifies whether the function system is to operate in its normal mode or in its emergency mode based on at least one of the availabilities.

4. The vehicle as claimed in claim 3, wherein
the function system is at least one system selected from the group consisting of a mobile telephone system, a navigation system and a hazard warning system.

5. The vehicle as claimed in claim 1, wherein
the availability coordinator reports a malfunction of the control system for autonomous driving.

6. The vehicle as claimed in claim 1, wherein
the vehicle comprises a plurality of movement systems, each of which can operate in a normal mode and in an emergency mode, and
the availability coordinator monitors availability of each movement system such that a plurality of availabilities are monitored, and
the availability coordinator specifies based on at least one the availabilities, whether each movement system is to operate in its normal mode or its emergency mode.

7. The vehicle as claimed in claim 1, wherein
the movement system comprises an electronic steering system,
the normal mode comprises steering the vehicle based on signals returned from a steering wheel movement sensor,
the emergency mode comprises ignoring the signals returned from the steering wheel movement sensor, and
restricted functionality or failure comprises failure to correctly detect steering wheel movements using the steering wheel movement sensor.

8. The vehicle as claimed in claim 7, wherein
the control system for autonomous driving, when turned on, autonomously drives the vehicle to a safe emergency stopping place or a repair station.

9. The vehicle as claimed in claim 7, wherein
the vehicle further comprises a function system to influence a function of the vehicle other than movement of the vehicle, the function system being operable in a normal mode and in an emergency mode, and the availability coordinator specifies for the function system to operate in its emergency mode in the event of restricted functionality or failure.

10. The vehicle as claimed in claim 9, wherein the function system is a hazard warning system.

11. The vehicle as claimed in claim 9, wherein
the function system is a telephone system, and
in its emergency mode, the telephone system sends an automatic emergency call to a repair station.

12. The vehicle as claimed in claim 1, wherein
the availability coordinator further comprises a combination instrument with a plurality of indicator lights, and
when the availability coordinator indicates a malfunction in the control system for autonomous driving, the availability coordinator reports the malfunction by turning on one of the indicator lights.

13. The vehicle as claimed in claim 1, wherein
the movement system, the control system for autonomous driving and the availability coordinator are connected by a controller area network (CAN) bus.

14. The vehicle as claimed in claim 1, wherein
the movement system, the control system for autonomous driving and the availability coordinator are connected by a FlexRay bus.

15. The vehicle as claimed in claim 1, wherein
the movement system is operable in the normal mode, in a first emergency mode and in a second emergency mode, and
the availability coordinator specifies, whether the movement system is to operate in its normal mode, in its first emergency mode or in its second emergency mode.

16. A method for controlling a vehicle, the vehicle comprising:
   a movement system disposed in the vehicle which includes at least one of a drive system, a brake system and a steering system, to influence movement of the vehicle, the movement system being operable in a normal mode and an emergency mode; and
   a control system for autonomous driving, the method comprising:
      monitoring, using at least one microprocessor, availability of the movement system;
      specifying based on the availability, whether the movement system is to operate in its normal mode or in its emergency mode; and
      turning on the control system for autonomous driving when the availability indicates restricted functionality or failure.

17. The method as claimed in claim 16, wherein
the control system for autonomous driving is operable in a normal mode and in an emergency mode, and
the method further comprises:
   monitoring availability of the control system for autonomous driving such that a plurality of availabilities are monitored; and
   specifying based on at least one of the availabilities, whether the control system for autonomous driving is to operate in its normal mode or in its emergency mode.

18. The method as claimed in claim 16, wherein
the vehicle further comprises a function system to influence a function of the vehicle other than movement of the vehicle, the function system being operable in a normal mode and in an emergency mode, and
the method further comprises:
   monitoring the availability of the function system such that a plurality of availabilities are monitored; and
   specifying whether the function system is to operate in its normal mode or in its emergency mode based on at least one of the availabilities.

19. The method as claimed in claim 16, further comprising:
reporting a malfunction of the control system for autonomous driving.

20. The method as claimed in claim 16, wherein
an availability coordinator monitors the availability, and
the method further comprises reporting a malfunction of the availability coordinator.

* * * * *

UNITED STATES PATENT AND TRADEMARK OFFICE
CERTIFICATE OF CORRECTION

PATENT NO.        : 9,102,335 B2                                    Page 1 of 1
APPLICATION NO.   : 14/350906
DATED             : August 11, 2015
INVENTOR(S)       : Rolf Mueller It is certified that error appears in the above-identified patent and that said Letters Patent is hereby corrected as shown below:

In the claims,

Claim 6, Column 6, Line 45

Delete "one" and insert --one of--, therefor.

Claim 15, Column 7, Line 27

Delete "mode" and insert --mode,--, therefor.

Signed and Sealed this
Twenty-fourth Day of November, 2015

Michelle K. Lee
*Director of the United States Patent and Trademark Office*